United States Patent
Fujita

(10) Patent No.: US 11,155,021 B2
(45) Date of Patent: Oct. 26, 2021

(54) METHOD OF PRODUCING MOLDED ARTICLE

(71) Applicant: FUJIMORI KOGYO CO., LTD., Tokyo (JP)

(72) Inventor: Shiro Fujita, Tokyo (JP)

(73) Assignee: FUJIMORI KOGYO CO., LTD., Tokyo (JP)

( * ) Notice: Subject to any disclaimer, the term of this patent is extended or adjusted under 35 U.S.C. 154(b) by 0 days.

(21) Appl. No.: 16/129,801

(22) Filed: Sep. 13, 2018

(65) Prior Publication Data

US 2019/0084215 A1    Mar. 21, 2019

(30) Foreign Application Priority Data

Sep. 19, 2017    (JP) .............................. JP2017-179272

(51) Int. Cl.
*B29C 51/14* (2006.01)
*B32B 7/12* (2006.01)
(Continued)

(52) U.S. Cl.
CPC ................ *B29C 51/14* (2013.01); *B32B 7/12* (2013.01); *B32B 27/08* (2013.01); *B32B 27/308* (2013.01);
(Continued)

(58) Field of Classification Search
CPC ................................. B29C 51/14; B29C 51/10
(Continued)

(56) References Cited

U.S. PATENT DOCUMENTS 6,783,850 B2 * 8/2004 Takizawa ........... C08G 18/6254
428/355 AC
7,655,106 B2 * 2/2010 Nishiyama ................ C09J 7/38
156/231
(Continued)

FOREIGN PATENT DOCUMENTS

CN    102202882 A    9/2011
JP    2010064448 A    3/2010
(Continued)

OTHER PUBLICATIONS

English Translation of JP2012035431 (Year: 2012).*
(Continued)

*Primary Examiner* — Matthew J Daniels
*Assistant Examiner* — Hana C Page
(74) *Attorney, Agent, or Firm* — Hauptman Ham, LLP

(57) ABSTRACT

A method of producing a molded article includes: laminating an adhesive sheet including an acrylic-based polymer and a polymerization initiator onto resin film, to produce a resin laminate; and covering an adherend with the resin film while the resin laminate is pressed against the adherend, and the resin film is stretched following a surface shape of the adherend. In planar view, the resin laminate is larger than the adherend. The covering step includes heating the resin laminate at 100° C. or higher and 180° C. or lower, superposing the resin laminate on the adherend planarly and pressing the resin laminate and the adherend under a reduced pressure environment, and then applying pressure to an environment opposite to the adherend with respect to the resin film. The adhesive sheet has an exothermic peak of 100° C. or higher and 180° C. or lower in differential scanning calorimetry at a temperature raising rate of 10° C./min.

6 Claims, 6 Drawing Sheets

(51) Int. Cl.

| | | |
|---|---|---|
| *B32B 27/08* | (2006.01) | |
| *B32B 27/30* | (2006.01) | |
| *B29C 51/10* | (2006.01) | |
| *C09J 175/14* | (2006.01) | |
| *B32B 27/36* | (2006.01) | |
| *C08G 18/67* | (2006.01) | |
| *C08G 18/48* | (2006.01) | |
| *C08G 18/42* | (2006.01) | |
| *C09J 175/16* | (2006.01) | |
| *C08G 18/10* | (2006.01) | |
| *B29K 67/00* | (2006.01) | |
| *B29K 33/00* | (2006.01) | |
| *B29K 105/00* | (2006.01) | |

(52) U.S. Cl.
CPC ............. *B32B 27/36* (2013.01); *C08G 18/10* (2013.01); *C08G 18/42* (2013.01); *C08G 18/48* (2013.01); *C08G 18/6715* (2013.01); *C09J 175/14* (2013.01); *C09J 175/16* (2013.01); *B29C 51/10* (2013.01); *B29K 2033/08* (2013.01); *B29K 2067/003* (2013.01); *B29K 2105/0097* (2013.01); *B29K 2105/256* (2013.01)

(58) Field of Classification Search
USPC ......................................................... 156/242
See application file for complete search history.

(56) References Cited

U.S. PATENT DOCUMENTS

| | | | |
|---|---|---|---|
| 10,357,908 B2* | 7/2019 | Tsujimura | B32B 27/08 |
| 2011/0229681 A1* | 9/2011 | Sakamoto | B32B 15/08 |
| | | | 428/68 |
| 2017/0218226 A1* | 8/2017 | Ho | B29C 48/022 |
| 2018/0022971 A1 | 1/2018 | Fujita et al. | |
| 2018/0044552 A1 | 2/2018 | Fujita et al. | |
| 2020/0165497 A1* | 5/2020 | Ikeda | C09J 133/12 |

FOREIGN PATENT DOCUMENTS

| | | |
|---|---|---|
| JP | 2010131901 A | 6/2010 |
| JP | 2012-35431 A | 2/2012 |
| JP | 2013-1769 A | 1/2013 |
| JP | 2016216554 A | 12/2016 |
| JP | 2017025152 A | 2/2017 |
| WO | 2017/013479 A1 | 1/2017 |

OTHER PUBLICATIONS

English Translation of WO2012060364 (Year: 2012).*
Office Action for Chinese Patent Application No. 201811079818.1 dated Jul. 15, 2020 and English summary thereof; 5 pgs.
Office Action for Chinese Patent Application No. 201811079818.1 dated Jan. 20, 2021 and English summary thereof; 5 pgs.
Office Action in Japanese Patent Application No. 2017-179272 dated May 11, 2021; 8 pgs.
Office Action in Chinese Patent Application No. 201811079818.1 dated May 27, 2021 with English summary; 5 pgs.

* cited by examiner

METHOD OF PRODUCING MOLDED ARTICLE

CROSS-REFERENCE TO RELATED APPLICATIONS

This application claims the priority from Japanese Patent Application No. 2017-179272 (filing date: Sep. 19, 2017). The entire teachings of the above application are incorporated herein by reference.

BACKGROUND OF THE INVENTION

Field of the Invention

The present invention relates to a method of producing a molded article.

Description of Related Art

An acrylic-based adhesive is used for laminating a substrate of a touch panel, a portable phone, a display, a laminated glass or the like to be bonded.

Japanese Unexamined Patent Application, First Publication No. 2012-035431 describes a pressure-sensitive adhesive sheet for a protective film, which is suitable for a film protecting a panel of a portable information terminal such as a portable phone or a touch panel, particularly, for a panel made of glass, and can be adhered following the shape of a panel. Japanese Unexamined Patent Application, First Publication No. 2012-035431 discloses a pressure-sensitive adhesive sheet for a protective film, in which a hard coat layer, a transparent substrate film, an adhesive layer, a polyester-based film, a pressure-sensitive adhesive layer, and a peeling sheet are laminated in sequence.

Japanese Unexamined Patent Application, First Publication No. 2013-001769 describes, as an acrylic-based pressure-sensitive adhesive agent used in a touch panel, a pressure-sensitive adhesive agent containing a main polymer having a crosslinking functional group, a low molecular weight polymer having a hydrogen bonding functional group, and an isocyanate-based crosslinking agent.

SUMMARY OF THE INVENTION

Meanwhile, the shape and kind of an adherend and a laminate to be adhered to each other with an adhesive are highly diversified. For example, when an adherend having a complicated shape is covered with a resin film with an adhesion layer interposed therebetween, it is necessary that the resin film can be uniformly and evenly adhered to the adherend following the shape of the adherend.

The pressure-sensitive adhesive sheet for a protective film described in Japanese Unexamined Patent Application, First Publication No. 2012-035431 has a problem that the layer configuration is complicated, the cost is high, and moreover, the sheet is difficult to adhere following a high level difference, due to an elastic force of the resin film.

Japanese Unexamined Patent Application, First Publication No. 2013-001769 describes, as effects, that the variation in electrical characteristics of the transparent conductive film is small, and at the same time, the wet-heat resistant stability and the level difference followability are good, and whitening and foaming are unlikely to occur; however, it is expected that adhesion following a high level difference will be difficult.

The present invention has been made in view of the above-mentioned circumstances, and an object thereof is to provide a method of producing a molded article, by which an adherend can be covered with a resin film uniformly.

That is, the present invention has adopted the following constituent features.

[1] A method of producing a molded article, the method comprising the steps of: laminating an adhesive sheet including an acrylic-based polymer and a polymerization initiator onto a surface of a resin film, to produce a resin laminate including the resin film and the adhesive sheet being laminated; and covering an adherend with the resin film while the resin laminate is pressed against the adherend and the resin film is stretched following a surface shape of the adherend, wherein a shape when the resin laminate is planarly viewed is larger than a shape when the adherend is planarly viewed, the covering step is a step of heating the resin laminate at a temperature of 100° C. or higher and 180° C. or lower, superposing the resin laminate on the adherend planarly and pressing the resin laminate and the adherend under a reduced pressure environment, and then applying pressure to an environment opposite to the adherend with respect to the resin film, and the adhesive sheet has an exothermic peak in a range of 100° C. or higher and 180° C. or lower in differential scanning calorimetry at a temperature raising rate of 10° C./min.

[2] The method of producing a molded article according to [1], wherein the adhesive sheet further comprises an acrylic-based monomer or an acrylic-based oligomer.

[3] The method of producing a molded article according to [2], wherein the acrylic-based monomer is a (meth)acrylate monomer containing a hydroxyl group or a polyfunctional acrylate monomer having a hydroxyl group.

[4] The method of producing a molded article according to [2], wherein the adhesive sheet contains a curable urethane acrylate as at least part of the acrylic-based monomer or acrylic-based oligomer.

[5] The method of producing a molded article according to any one of [1] to [4], wherein the adhesive sheet after heating has an adhesion strength of 30 N/25 mm or more.

[6] The method of producing a molded article according to any one of [1] to [5], wherein the polymerization initiator is a thermal polymerization initiator.

[7] The method of producing a molded article according to [6], wherein a polymerization initiation temperature of the thermal polymerization initiator is lower than a heating temperature in the covering step by 10° C. or higher and 50° C. or lower.

[8] The method of producing a molded article according to any one of [1] to [7], comprising, before the step of producing a resin laminate, a step of mixing an acrylic-based polymer and a polymerization initiator to produce an adhesive raw material composition, applying the adhesive raw material composition onto a separator, and further superposing another separator on the adhesive raw material composition to be held, to produce an adhesive sheet holding body, wherein the step of producing a resin laminate is a step of peeling one separator of the adhesive sheet holding body to be laminated to the resin film, followed by peeling another separator.

[9] The method of producing a molded article according to any one of [1] to [8], comprising, before the step of producing a resin laminate, a step of forming a printing layer or a deposition layer on the resin film.

[10] The method of producing a molded article according to any one of [1] to [9], wherein a forming material of the resin film is at least one selected from the group consisting of an acrylic-based resin, a polyolefin-based resin, a urethane resin, a polyamide resin, a polycarbonate resin, and an ABS resin.

[11] The method of producing a molded article according to any one of [1] to [10], wherein in the adherend, a surface to be covered with the resin film includes a level difference having an angle of 90 degrees or more.

[12] The method of producing a molded article according to any one of [1] to [11], wherein a forming material of the adherend is at least one selected from the group consisting of a carbon fiber-reinforced plastic, a polycarbonate resin, an acrylic-based resin, and an ABS resin.

The present invention can provide a method of uniformly covering, with a resin film, an adherend having any one or both of a curved surface and a level difference.

DETAILED DESCRIPTION OF PREFERRED EMBODIMENTS

<Method of Producing Molded Article>

Figure 1:
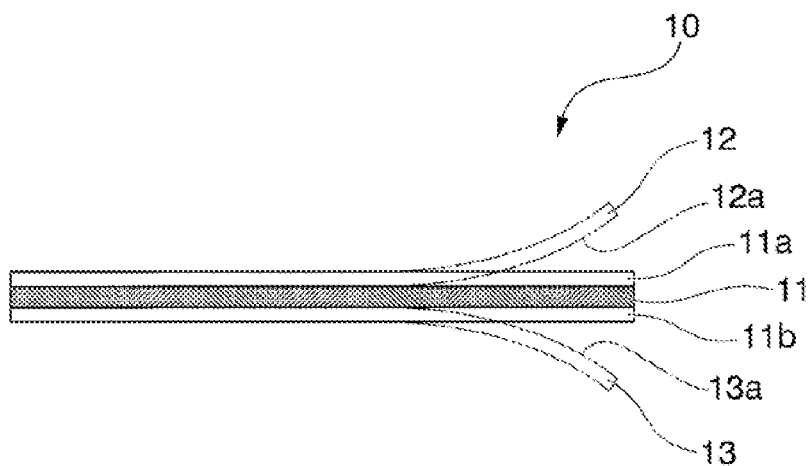
FIG. 1 is a view showing one example of a cross-sectional view of a laminate used in the present embodiment.

A method of producing a molded article according to the present embodiment is characterized in that the method includes steps of: laminating an adhesive sheet including an acrylic-based polymer and a polymerization initiator onto a surface of a resin film, to produce a resin laminate including the resin film and the adhesive sheet being laminated; and covering an adherend with the resin film while the resin laminate is pressed against the adherend and the resin film is stretched following a surface shape of the adherend, in which a shape when the resin laminate is planarly viewed is larger than a shape when the adherend is planarly viewed, the covering step is a step of heating the resin laminate at a temperature of 100° C. or higher and 180° C. or lower, superposing the resin laminate on the adherend planarly and pressing the resin laminate and the adherend under a reduced pressure environment, and then applying pressure to an environment opposite to the adherend with respect to the resin film, and the adhesive sheet has an exothermic peak in a range of 100° C. or higher and 180° C. or lower in differential scanning calorimetry at a temperature raising rate of 10° C./min.

According to the method of producing a molded article of the present embodiment, for example, an adherend having a curved surface or a level difference can be covered with a resin film following the shape of the adherend. For this reason, for the purpose of imparting design properties, an adherend having a complicated shape can be covered with a resin film rich in designability following the shape of the adherend.

Each step of the method of producing a molded article of the present embodiment will be illustrated below.

<<Step of Producing Resin Laminate>>

The step of producing a resin laminate is a step of laminating an adhesive sheet including an acrylic-based polymer and a polymerization initiator onto a surface of a resin film, to produce a resin laminate including the resin film and the adhesive sheet being laminated.

In the present step, a sheet-like adhesion layer is produced. In the method of producing a molded article of the present embodiment, the adherend can be covered with the resin film following the surface shape of the adherend by using the sheet-like adhesion layer.

In the present step, it is preferable that first, an adhesive raw material composition containing an acrylic-based polymer and a polymerization initiator is produced. Since it is possible to apply the adhesive raw material composition with better thickness precision when the composition is dissolved in an organic solvent, the adhesive raw material composition preferably contains an organic solvent. By drying the solvent from the adhesive raw material composition, an adhesive sheet is obtained. That is, the constitution of the adhesive raw material composition may be such that the solvent is added to the constitution of the adhesive resin composition constituting the adhesive sheet. The adhesive sheet functions as a pressure-sensitive adhesive layer at an ambient temperature (before thermal curing).

The adhesive sheet in the present invention can be produced by applying the adhesive raw material composition to a separator film with the adhesive raw material composition containing a solvent, drying the adhesive raw material composition, followed by protection with a separator film.

In the present embodiment, it is preferable that the method includes, before the step of producing a resin laminate, a step of mixing an acrylic-based polymer and a polymerization initiator to produce an adhesive raw material composition, applying the adhesive raw material composition onto a separator, and further superposing another separator on the adhesive raw material composition to be held, to produce an adhesive sheet holding body.

It is preferable that the adhesive raw material composition is applied using a die or a pipe doctor. In drying the solvent, drying with heat, ventilation, pressure reduction, a combination thereof or the like is preferable. Regarding a time for drying the solvent, in view of productivity, 10 minutes or shorter is preferable, and 2 to 5 minutes is further preferable. Additionally, since it is necessary to sufficiently dry the organic solvent, it is preferable to perform drying at a temperature of not lower than the boiling point of the organic solvent, and it is preferable to perform drying at not higher than a 1-minute half-life temperature of the thermal polymerization initiator.

Each material constituting an adhesive layer will be described below.

Acrylic-Based Polymer

Examples of a monomer constituting the acrylic-based polymer include an acrylic-based monomer having an ester group (—COO—), an acrylic-based monomer having a carboxyl group (—COOH), an acrylic-based monomer having an amide group (—CONR$_2$ wherein R is a hydrogen atom or a substituent such as an alkyl group), an acrylic-based monomer having a nitrile group (—CN), and a nonacrylic-based monomer such as olefins, styrene, vinyl esters, vinyl ethers, and vinylsilane. As the acrylic-based polymer, a copolymer composed of two or more monomers is preferable. A number average molecular weight of the acrylic-based polymer before photopolymerization is preferably, for example, about 50,000 to 1,000,000. Examples of the viscosity include about 1,000 to 10,000 mPa·s.

Examples of the acrylic-based monomer having an ester group (—COO—) include alkyl (meth)acrylate, (meth)acrylate having a hydroxy group (hydroxyl group), (meth)acrylate having an alkoxy group or a polyether group, (meth)acrylate having an amino group or a substituted amino group, and the like. In addition, in the present specification, (meth)acrylate is a generic name of acrylate and methacrylate.

Examples of the acrylic-based monomer having a carboxy group (—COOH) include acrylic acid, methacrylic acid, (meth)acrylate having a carboxyl group (—COOH), and the like.

Examples of the acrylic-based monomer having an amide group (—$CONR_2$ wherein R is a hydrogen atom or a substituent such as an alkyl group) include acrylamide, methacrylamide, and the like.

Examples of the acrylic-based monomer having a nitrile group (—CN) include acrylonitrile, methacrylonitrile, and the like.

It is preferable that in the acrylic-based polymer, 50% by weight or more of a constituent monomer is composed of an acrylic-based monomer. Particularly, it is preferable that 50% by weight or more of the constituent monomer is composed of one or two or more of alkyl (meth)acrylates represented by the general formula $CH_2=CR^1-COOR^2$ (wherein $R^1$ represents hydrogen or a methyl group, and $R^2$ represents an alkyl group having 1 to 14 carbon atoms). Specific examples of the alkyl (meth)acrylate include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-pentyl (meth)acrylate, isopentyl (meth)acrylate, n-hexyl (meth) acrylate, 2-ethylhexyl (meth)acrylate, n-octyl (meth)acrylate, isooctyl (meth)acrylate, isononyl (meth)acrylate, decyl (meth)acrylate, and dodecyl (meth)acrylate. Particularly, it is preferable to essentially use alkyl (meth)acrylate in which the carbon number of an alkyl group $R^2$ is 4 to 12 (for example, 50 to 100 mol %).

Additionally, examples of the (meth)acrylate containing a hydroxyl group include one or two or more of 2-hydroxyethyl (meth)acrylate, 2-hydroxypropyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, polyethylene glycol mono(meth)acrylate, polypropylene glycol mono(meth)acrylate, cyclohexanedimethanol mono(meth)acrylate, and the like.

Acrylic-Based Monomer or Acrylic-Based Oligomer

Of the acrylic-based monomers or the acrylic-based oligomers, examples of the acrylic-based monomer include one or two or more of monomers similar to the monomers constituting the above-mentioned acrylic-based polymer, for example, alkyl (meth)acrylate, (meth)acrylate having a hydroxyl group, acrylamide, and the like. The number of polymerizable functional groups such as a (meth)acryloyl group in one molecule may be 1 or 2 or more.

Particularly, when a monomer of (meth)acrylate having a hydroxyl group is contained as at least part of the acrylic-based monomer or the acrylic-based oligomer, the hydroxyl group having polarity becomes easy to disperse in the whole adhesive sheet. Thereby, since the moisture is hardly condensed, and cloudiness of the adhesive sheet is suppressed even under the environment having high humidity (further, high temperature), this is preferable. In the (meth)acrylate having a hydroxyl group, the number of hydroxyl groups in one molecule may be 1 or 2 or more.

Additionally, as at least part of the acrylic-based monomer or the acrylic-based oligomer, curable urethane acrylate can be used. Urethane acrylate is a compound having a urethane bond (—NH—COO—) and a (meth)acryloyloxy group ($CH_2=CX-COO-$ wherein X=H or $CH_3$) in the same molecule. Among urethane acrylates, the curable urethane acrylate is a compound having curability due to a (meth)acryloyloxy group that is a polymerizable functional group. The number of urethane bonds in one molecule may be 1 or 2 or more. Additionally, the number of (meth)acryloyloxy groups in one molecule may be 1 or 2 or more.

Examples of the urethane acrylate include a compound obtained by reacting a (meth)acrylate compound having a hydroxyl group with an isocyanate compound, a compound obtained by reacting a urethane prepolymer obtained by reacting a polyol compound with a polyisocyanate compound, with a (meth)acrylate compound having a hydroxyl group, and the like. Examples of the polyol compound include polyester polyol, polyether polyol, and the like.

It is preferable that the acrylic-based monomer or the acrylic-based oligomer is a liquid (fluid) that becomes part of a polymer by curing with a polymerization initiator and that has a lower viscosity than the polymer. It is also possible to use the acrylic-based monomer and the acrylic-based oligomer concurrently. Examples of the acrylic oligomer include acrylate oligomers such as a urethane acrylate oligomer. The number of polymerizable functional groups possessed by the acrylic monomer or the acrylic oligomer is, for example, 1 to 10 or 2 to 5. In the present embodiment, it is preferable to use a polyfunctional acrylate monomer.

It is preferable that the adhesive resin composition contains the acrylic-based monomer or the acrylic-based oligomer in an amount of 5 to 50 parts by weight based on 100 parts by weight of the acrylic-based polymer. When an addition amount of the acrylic monomer or the acrylic oligomer is too large, the adhesive force of an adhesive resin layer may be reduced too much in the case of polymerization.

When the adhesive resin composition contains the acrylic-based monomer or the acrylic-based oligomer, the flowability of the adhesive resin composition is increased. When the flowability of the adhesive resin composition is high, the adhesive resin composition becomes easy to fit to the surface of an adherend even in the case where the adherend has fine irregularities on its surface. For this reason, the surface of the adherend after covering can be smoothed, and appearance after covering can be improved.

Polymerization Initiator

As the polymerization initiator, a thermal polymerization initiator is preferable, and examples of the thermal polymerization initiator include a radical initiator that is degraded by heat to initiate polymerization of a monomer (radical polymerization) and curing of a resin. As the radical initiator, an (organic) peroxide-based radical initiator, an azo-based radical initiator, and the like are preferable from the viewpoint of easy handling of the adhesive sheet.

In the present embodiment, it is preferable that a polymerization initiation temperature of the thermal polymerization initiator is lower than a heating temperature in the covering step described later by 10° C. or higher and 50° C. or lower. With the polymerization initiation temperature satisfying the above-mentioned conditions, a polymerization reaction of a polymer component contained in the adhesive sheet can be performed at the same time by heating treatment in the covering step.

Specific examples of the (organic) peroxide-based thermal polymerization initiator include diacyl peroxides such as benzoyl peroxide, acetyl peroxide, decanoyl peroxide, and lauroyl peroxide; dialkyl peroxides such as dicumyl peroxide and di-t-butyl peroxide; alkyl peroxyesters such as t-butyl peroxybenzoate and t-butyl peroxy-2-ethylhexanoate; hydroperoxides such as cumene hydroperoxide and t-butyl hydroperoxide; and the like. Examples of a preferable organic peroxide include t-hexyl peroxyneodecanoate, t-butyl peroxyneodecanoate, t-butyl peroxyneoheptanoate, t-hexyl peroxypivalate, t-butyl peroxypivalate, dilauroyl peroxide, 1,1,3,3-tetramethylbutyl peroxy-2-ethylhexanoate, disuccinic acid peroxide, t-hexyl peroxy-2-ethylhexanoate, t-butyl peroxy-2-ethylhexanoate, 1,1-bis(t-hexylperoxy)cyclohexane, 1,1-bis(t-butylperoxy)cyclohexane, t-hexylperoxyisopropyl monocarbonate, t-butylperoxymaleic acid, t-butyl peroxy 3,5,5-trimethyl hexanoate, t-butylperoxyisopropyl monocarbonate, t-butylperoxy-2-ethylhexyl monocarbonate, t-butyl peroxylaurate, t-hexyl peroxybenzoate, t-butyl peroxyacetate, t-butyl peroxybenzoate, n-butyl 4,4-bis(t-butylperoxy)valerate, dicumyl peroxide, di-t-hexyl peroxide, di-t-butyl peroxide, p-menthane hydroperoxide, and the like.

Examples of the azo-based thermal polymerization initiator include 2,2'-azobis(isobutyronitrile), 2,2'-azobis(2-methylbutyronitrile), 2,2'-azobis(2,4-dimethylvaleronitrile), 2,2'-azobis(4-cyanovaleronitrile), 2,2'-azobis(4-methoxy-2,4-dimethylvaleronitrile), 2,2'-azobis(methylisobutyrate), 1,1'-azobis(1-cyclohexanecarbonitrile), and the like.

It is preferable that an addition amount of the thermal polymerization initiator is 0.001 to 0.5 parts by weight based on 100 parts by weight of the acrylic-based polymer.

A polymerization retarder may be added to the adhesive sheet. By use of the polymerization retarder, it becomes easy to control a polymerization degree. Additionally, use of the polymerization retarder is preferable from the viewpoint that the followability to deformation of a substrate is improved.

The adhesive resin composition can further contain arbitrary components other than the above-mentioned components.

For example, a crosslinking agent (curing agent) such as an isocyanate-based crosslinking agent, an epoxy-based crosslinking agent, and a metal chelate compound are suitably used for crosslinking the acrylic-based polymer, or a polymer which is produced by polymerization of the acrylic monomer or the acrylic oligomer. In this case, as necessary, a polymer or a monomer having a functional group reacting with the crosslinking agent is used as at least part of the acrylic-based polymer, or the acrylic monomer or the acrylic oligomer. For example, in the case of the isocyanate-based crosslinking agent, the functional group reacting with the crosslinking agent is a hydroxyl group, a carboxy group or the like. An addition amount of the crosslinking agent is preferably, for example, 1.5 equivalents or less relative to the functional group of the polymer.

Curing of the acrylic-based polymer with the crosslinking agent (curing agent) may be allowed to proceed by aging, at a stage of producing an adhesive sheet before sticking to an adherend.

Examples of other arbitrary components include an antioxidant, a filler, a plasticizer, and the like. The adhesive raw material composition used in producing the adhesive resin layer may contain water or a solvent such as an organic solvent, or may be a solvent-free syrup-like composition.

When a material which is potentially corroded, such as an oxide conductive film such as ITO or a base metal exists on a substrate, and the adhesive resin layer contacts the material, it is preferable to reduce a corrosive component such as an acid, and, for example, to use a polymer having a low acid value, as a material of the adhesive resin composition.

In the present embodiment, it is preferable that the adhesive sheet obtained by the step of producing the adhesive sheet holding body is in the state where the adhesive sheet is held with two separators. In the step of producing a resin laminate described later, it is preferable that one of the separators of the above-mentioned adhesive sheet holding body is peeled, the sheet is laminated on the resin film, and thereafter, the other separator is peeled.

<<Step of Covering with Resin Film>>

FIG. 1 shows a cross-sectional view of one example of a laminate 10. It is preferable that the laminate 10 has two separators 12 and 13, and an adhesive sheet 11 which is laminated between the two separators 12 and 13. An adhesive resin composition constituting the adhesive sheet 11 is as described above. Both surfaces 11a and 11b of the adhesive sheet 11 have pressure-sensitive adhesiveness at an ambient temperature (both surfaces 11a and 11b are pressure-sensitive adhesive surfaces).

The adhesive sheet 11 is composed of an adhesive resin composition in the entire thickness direction. If the sheet is composed of the adhesive resin composition satisfying the requirement, the adhesive sheet 11 may comprise two or more layers composed of the same or different adhesive resin composition(s). When the adhesive sheet 11 comprises a monolayered adhesive resin layer, since the cost can be reduced by simplifying the layer configuration, this is preferable. The adhesive resin composition contains an acrylic-based adhesive resin (polymer). The optical properties of the adhesive resin composition are not limited, and the composition may have transparency, or may be translucent or opaque.

The separators 12 and 13 have peelability on the surfaces 12a and 13a that are in contact with the adhesive sheet 11 (the surfaces 12a and 13a are peeling surfaces). Examples of a configuration of the separators 12 and 13 include a configuration in which a peeling agent layer is provided on one side or both sides of a resin film, and a configuration in which a peeling agent is contained in the resin of a resin film. In place of the resin film, paper, synthetic paper, metal foils, various sheets, and the like can also be used. When the separators 12 and 13 have transparency, since an optical inspection of the adhesive sheet 11 can be conducted while maintaining the laminate 10 in which the separators 12 and 13 are not peeled, this is preferable.

The laminate 10 shown in FIG. 1 can stick an adherend and a resin film with pressure-sensitive adhesive surfaces 11a and 11b, which are exposed after the separators 12 and 13 are peeled from the adhesive sheet 11.

Figure 2:
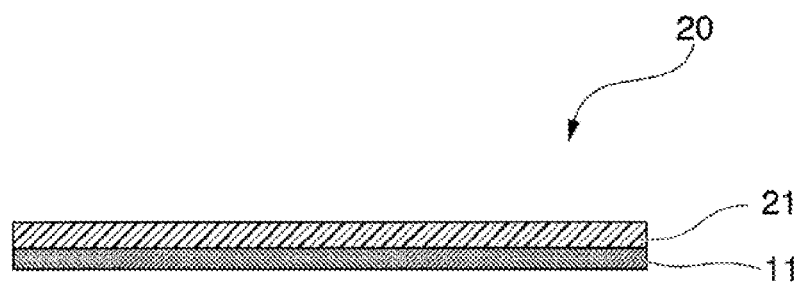
FIG. 2 is a view showing one example of a cross-sectional view of a resin laminate used in the present embodiment.

FIG. 2 shows one example of a resin laminate 20 in which a resin film 21 is laminated on the adhesive sheet 11.

When the resin laminate 20 as shown in FIG. 2 is formed, an order of peeling the separators 12 and 13 is not particularly limited. For example, the resin film may be stuck on one of pressure-sensitive adhesive surfaces, which is exposed after one of the separators is peeled.

The adhesive sheet 11 has an exothermic peak in a range of 100° C. or higher and 180° C. or lower in differential scanning calorimetry (DSC) at a temperature raising rate of 10° C./min.

By confirmation of the peak between 100° C. or higher and 180° C. or lower, thermal curing can be allowed to proceed at a similar temperature to this.

The adhesive sheet 11 has a haze value of preferably 3.0 or less, more preferably 2.5 or less, and particularly preferably 1.0 or less. Additionally, the adhesive sheet 11 has a total light transmittance of preferably 80% or more, more preferably 82% or more, and particularly preferably 85% or more.

When the haze value of the adhesive sheet 11 is in the above-mentioned range, the transparency of a molded article can be secured in the case where, for example, the molded article is covered with a transparent resin film.

The adhesive sheet 11 has a film thickness of preferably 10 μm or more, more preferably 20 μm or more, and particularly preferably 30 μm or more. The adhesive sheet 11 has a film thickness of preferably 200 μm or less, more preferably 190 μm or less, and particularly preferably 185 μm or less.

The above-mentioned upper limit values and lower limit values can be arbitrarily combined.

The adhesive sheet 11 after heating has an adhesion strength of preferably 30 N/25 mm or more, more preferably 35 N/25 mm or more, and particularly preferably 40 N/25 mm or more. As the adhesion strength, a value measured by the measurement method defined in JIS C6471 (peeling measurement method A) is used.

In the present embodiment, the adhesion strength of the adhesive sheet is improved by heating in the covering step described later.

In the present embodiment, it is preferable that a forming material of the resin film is at least one selected from the group consisting of an acrylic-based resin, a polyolefin-based resin, a urethane resin, a polyamide resin, a polycarbonate resin, and an ABS resin. Inter alia, an acrylic-based resin, a polycarbonate resin or an ABS resin is particularly preferable.

Arbitrary Configuration

In the present embodiment, it is preferable that for the purpose of improving design properties, strength or the like, the method includes a step of forming a printing layer or a deposition layer on the resin film before the step of producing a resin laminate. By printing a design on the resin film by a conventional method, design properties can be imparted to an adherend when the adherend is covered with the resin film Additionally, by depositing a metal component such as aluminum on the resin film, metallic luster can be imparted to an adherend when the adherend is covered with the resin film.

<<Covering Step>>

The covering step is a step of heating the resin laminate, superposing the resin laminate on the adherend planarly and pressing the resin laminate and the adherend under a reduced pressure environment, and then applying pressure to an environment opposite to the adherend with respect to the resin film.

Figure 3:
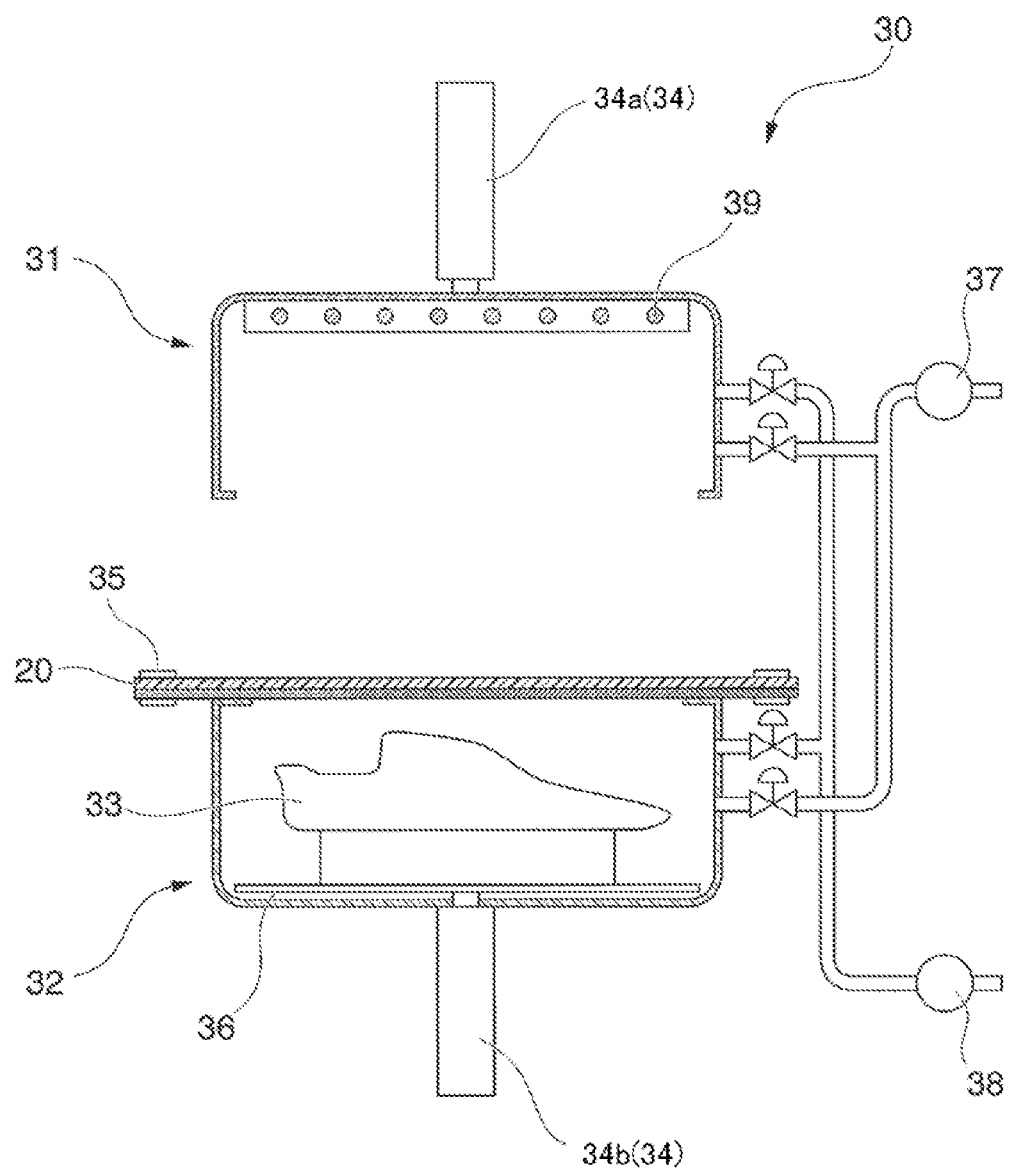
FIG. 3 is a schematic cross-sectional view of one example of a vacuum molding apparatus used in the present embodiment.

In the present step, it is preferable to use a vacuum molding apparatus. FIG. 3 shows one example of a vacuum molding apparatus 30 which can be suitably used in the present embodiment.

The vacuum molding apparatus which can be suitably used in the present embodiment is provided with molding chambers at upper and lower positions, and performs vacuum molding of the resin laminate between the two molding chambers. A vacuum circuit and an air circuit are installed, respectively, in the upper and lower molding chambers.

An upper molding chamber 31 and a lower molding chamber 32 can be joined to be closed, and can be separated from each other. That is, the upper molding chamber 31 is provided with a driving device 34a, and can be elevated and lowered. Additionally, a table 36 is disposed inside the lower molding chamber 32, and the above-mentioned table 36 can be elevated and lowered with a driving device 34b. As each driving device 34, for example, an air cylinder, a hydraulic cylinder, a servomotor or the like can be used. An adherend 33 to be covered with the resin laminate 20 is placed on the above-mentioned table 36. The resin laminate 20 is arranged between the upper molding chamber 31 and the lower molding chamber 32 by being fixed with a clamp 35. Furthermore, the vacuum molding apparatus 30 is provided with a gas supply chamber 37 and a gas suction chamber 38.

A heater 39 is incorporated into the upper molding chamber 31, and the resin laminate 20 is heated with the heater 39 between both molding chambers which have been joined and closed. An example of the heater 39 includes a near infrared heater.

A method of using this vacuum molding apparatus 30 is as follows.

As shown in FIG. 3, the adherend 33 is placed and set on the table 36 in the lower molding chamber 32. The resin laminate 20 is fixed and set on an upper surface of the lower molding chamber 32 with the clamp 35. In that case, both the interior of the upper molding chamber and the interior of the lower molding chamber are in an atmospheric pressure state.

Figure 4:
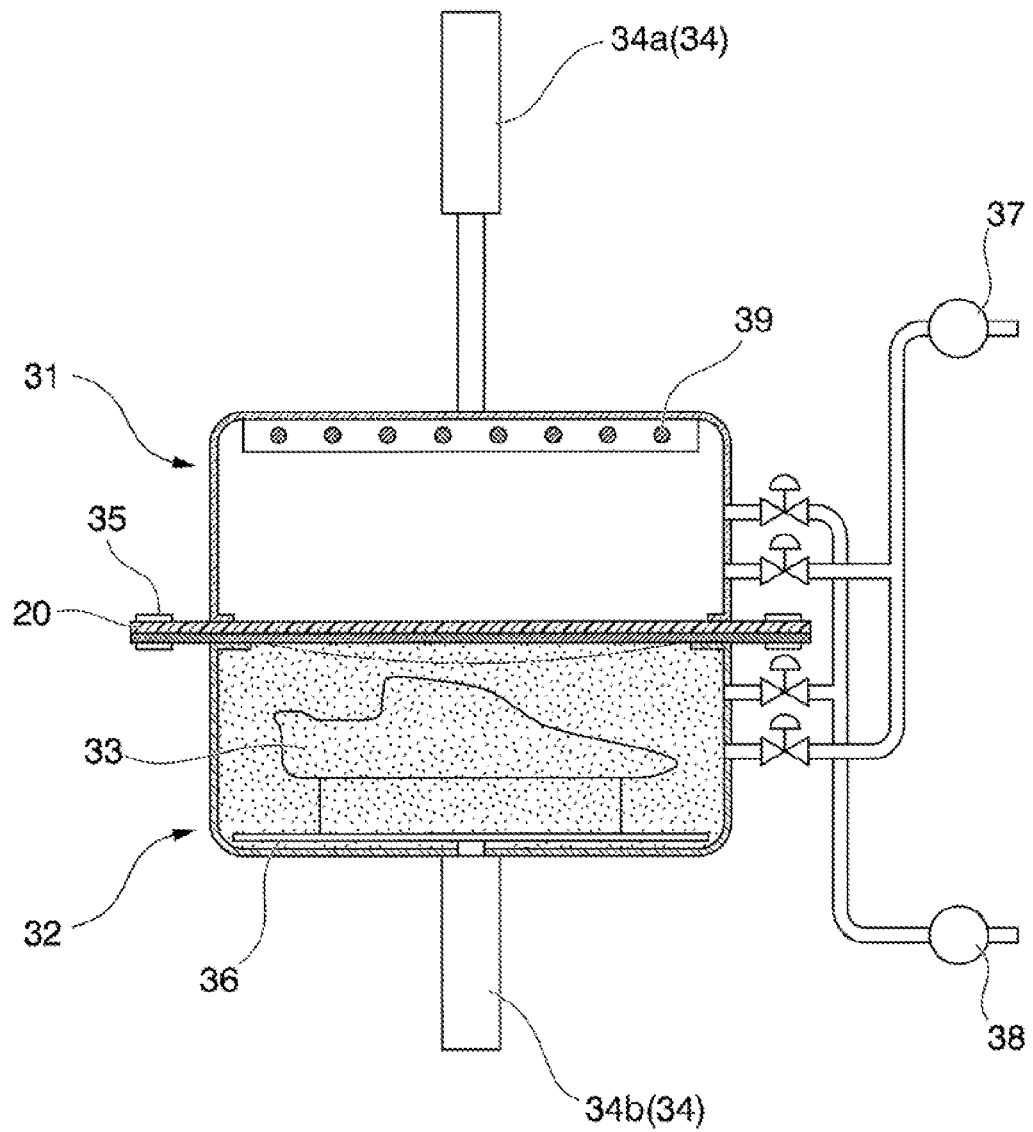
FIG. 4 is a schematic cross-sectional view of one example of the vacuum molding apparatus used in the present embodiment.

As shown in FIG. 4, the upper molding chamber 31 is lowered, and the upper molding chamber and the lower molding chamber are closed and joined to bring the interiors of the molding chambers into a closed state. The interior of the upper molding chamber and the interior of the lower molding chamber are both brought into a vacuum suction state or a reduced pressure state (expressed with black dots in the figure) with a vacuum tank (not shown) from the atmospheric pressure state.

As shown in FIG. 4, the interior of the upper molding chamber and the interior of the lower molding chamber are both in a vacuum suction state or a reduced pressure state. The heater 39 is switched on (expressed with black solid in the figure) to heat the resin laminate 20. When heated, the resin laminate 20 tends to hang down with its weight (see a two-dot chain line).

By heating the resin laminate 20 with the heater 39, softening of the resin film and curing of the adhesive sheet progress simultaneously. With softening of the resin film by heating, the resin film is stretched following the surface shape of the adherend when being pressed, and the adherend can be covered with the resin film following the surface shape of the adherend.

Figure 5:
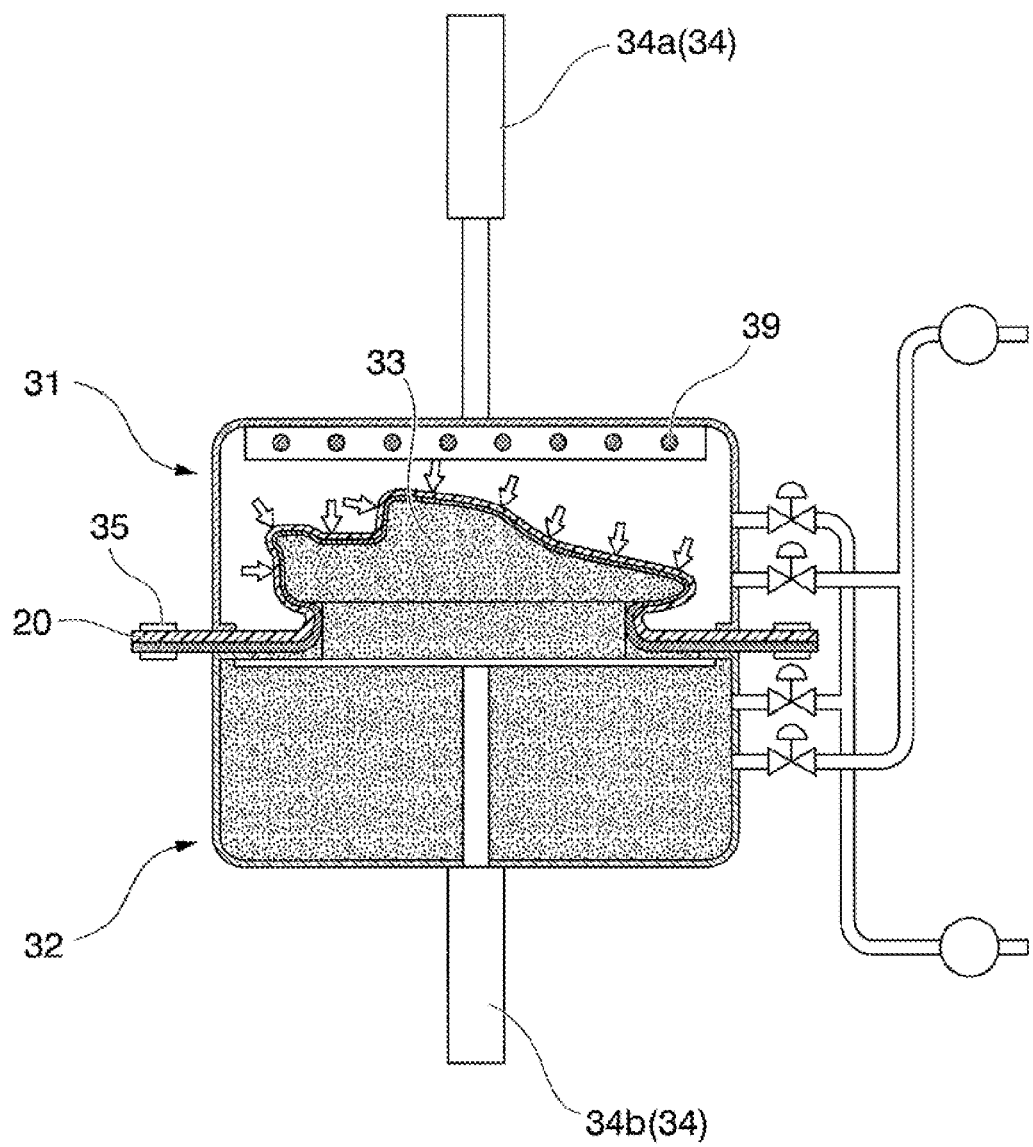
FIG. 5 is a schematic cross-sectional view of one example of the vacuum molding apparatus used in the present embodiment.

As shown in FIG. 5, thereafter, the table 36 in the lower molding chamber 32 is elevated. In that case, the interior of the upper molding chamber and the interior of the lower molding chamber are substantially in a vacuum state.

As shown in FIG. 5, by releasing vacuum in the upper molding chamber 31 and taking the atmospheric air therein, the adherend 33 is covered with the resin laminate 20 via the adhesive sheet as shown with an arrow.

Figure 6:
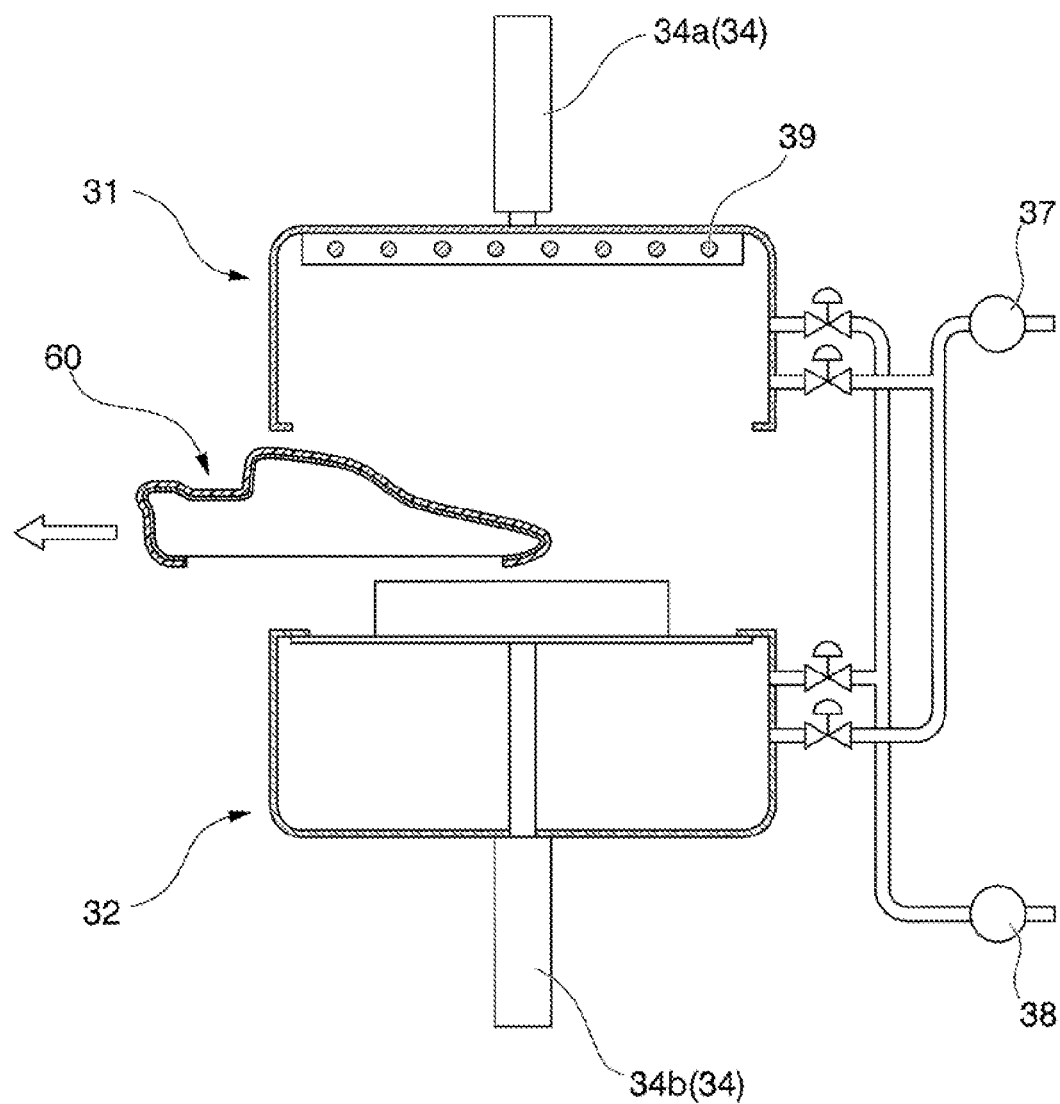
FIG. 6 is a schematic cross-sectional view of one example of the vacuum molding apparatus used in the present embodiment.

As shown in FIG. 6, when the covering is completed, the heater 39 is switched off, vacuum in the lower molding chamber is also released to return to the atmospheric pressure state, the upper molding chamber is elevated, a covered adherend 60 is taken out, and the covering step is completed.

In the present step, the interior of the upper molding chamber is pressurized with a valve connecting to the gas supply chamber 37 and a valve connecting to the gas suction chamber 38, the interior of the lower molding chamber is controlled at a reduced pressure environment, and the resin laminate 20 is kept in the horizontal state, so that the resin film is stretched following the surface shape of the adherend, and the adherend can be uniformly covered with the resin film Adherend In the present specification, the "adherend" is a target member that is covered with the resin film via the adhesive sheet.

According to the method of producing a molded article of the present embodiment, an adherend having any one or both of a curved surface and a level difference can be more suitably covered with the resin film uniformly.

According to the method of producing a molded article of the present embodiment, even in the case of an adherend having a curved surface, the resin film can be uniformly adhered to the surface of the adherend evenly with the above-mentioned resin laminate following a shape of a concave curved surface or a convex curved surface by molding the resin laminate with use of the vacuum molding apparatus.

According to the present embodiment, an adherend provided with a level difference having an angle of 90 degrees or more can be suitably covered with the resin film. The "angle of 90 degrees or more" is an angle formed by two line segments coming in contact with the surface in the cross section of the molded article, and means that an angle on an external side of the molded article is 90 degrees or more. Examples of a level difference having an angle of 90 degrees or more, which may be possessed by the adherend, include a level difference having an angle of 120 degrees, 150 degrees, 170 degrees or the like.

In the present embodiment, the adherend can be covered with the resin film following the shape of the adherend. Accordingly, even in the case of an adherend having an angle of 90 degrees or more, the surface of the adherend can be adhered with the resin film uniformly and evenly.

In the present embodiment, a material of the adherend is not particularly limited; however, it is preferably at least one selected from the group consisting of a carbon fiber-reinforced plastic, a polycarbonate resin, an acrylic-based resin, an ABS resin, a polyester-based resin, and a vinyl chloride-based resin.

EXAMPLES

The present invention will be described in further detail below by way of examples, but the present invention is not limited by these examples.

Example 1

<Adhesive Raw Material Composition Producing Step>

Using SK Dyne (registered trademark) 2094 (Soken Chemical & Engineering Co., Ltd.) as a polymer solution containing an acrylic-based polymer, and E-AX (Soken Chemical & Engineering Co., Ltd.) as a crosslinking agent, the crosslinking agent was blended at a ratio of 0.1 parts by weight based on 100 parts by weight of the acrylic-based polymer. To the resulting mixture were added 15 parts by weight of UV-3310 as urethane acrylate, and 0.1 parts by weight of PERHEXA (registered trademark) 25O (2,5-dimethyl-2,5-di(2-ethylhexanoyl)hexane (manufactured by NOF CORPORATION)) as a thermal polymerization initiator, to prepare an adhesive raw material composition.

<Resin Laminate Producing Step>

After the adhesive raw material composition was applied on an upper surface of a separator 13 (manufactured by FUJIMORI KOGYO CO., LTD.; product name: 125E-0010DG2.5AS, thickness 125 μm) using an applicator so that a thickness of the adhesive resin layer (adhesive sheet) 11 after drying became 60 μm, the solvent was dried under conditions of 90° C. and 2 minutes in a drying step. A separator 12 (manufactured by FUJIMORI KOGYO CO., LTD.; product name: 38E-0010 BDAS, thickness 38 μm) was stuck on an upper surface of the resulting adhesive resin layer (adhesive sheet) 11, to prepare a laminate 10.

Then, the separator 13 was peeled from the laminate 10 to expose the pressure-sensitive adhesive surface 11b of the adhesive resin layer (adhesive sheet) 11, and the adhesive resin layer (adhesive sheet) 11 was stuck to a resin film 21 (PET). Further, the separator 12 was peeled from the adhesive resin layer (adhesive sheet) 11 to obtain a resin laminate of Example 1.

Examples 2 to 5 and Comparative Examples 1 to 2

Regarding resin laminates of Examples 2 to 5 and Comparative Examples 1 to 2, resin laminates were produced in a similar manner of Example 1 except that the constitution of the adhesive raw material composition and the thickness of the adhesive resin layer (adhesive sheet) were changed as described in the following Table 1.

TABLE 1

| | Constitution of Adhesive Raw Material Composition | | | | Film Thickness of Adhesive Resin Layer |
|---|---|---|---|---|---|
| | Acrylic-based Polymer | Monomer Component | Crosslinking Agent | Polymerization Initiator | (Adhesive Sheet) (μm) |
| Example 1 | SK Dyne 2094 [100] | UV-3310 [15] | E-AX [0.1] | PERHEXA 25O [0.1] | 60 |
| Example 2 | SK Dyne 2094 [100] | UV-3310 [15] | E-AX [0.1] | PERHEXA HC [0.1] | 60 |
| Example 3 | SK Dyne 2094 [100] | UV-3310 [15] | E-AX [0.1] | PERHEXA 25O [0.1] | 20 |
| Example 4 | SK Dyne 2094 [100] | UV-3310 [15] | E-AX [0.1] | PERHEXA 25O [0.1] | 120 |
| Example 5 | SK Dyne 2094 [100] | UV-3310 [15] | E-AX [0.1] | PERHEXA 25O [0.1] | 180 |
| Comparative Example 1 | SK Dyne 2094 [100] | UV-3310 [15] | E-AX [0.1] | PEROYL IB [0.1] | 60 |
| Comparative Example 2 | SK Dyne 2094 [100] | UV-3310 [15] | E-AX [0.1] | PERMENTHA H [0.1] | 60 |

In Table 1, a numerical value in [ ] is a blending amount (parts by weight).

In Table 1, "SK Dyne 2094" represents a product name of an acrylic-based polymer, SK Dyne (registered trademark) 2094 (Soken Chemical & Engineering Co., Ltd., acid value: 33, number average molecular weight 70,000, solid matter concentration 25%).

"E-AX" represents a product name of an epoxy-based curing agent (Soken Chemical & Engineering Co., Ltd.).

"UV-3310" represents a product name of urethane acrylate (The Nippon Synthetic Chemical Industry Co., Ltd.). The physical properties of UV-3310 are as follows: viscosity at 60° C. is 40,000 to 70,000 mPa·s, weight average molecular weight Mw is 5,000, oligomer functional group number is 2, and glass transition temperature Tg is 22° C.

PERHEXA (registered trademark) HC is a thermal polymerization initiator containing 1,1-bis(t-hexylperox)cyclohexane as an active component.

PERHEXA (registered trademark) 25O is 2,5-dimethyl-2,5-di(2-ethylhexanoyphexane (manufactured by NOF CORPORATION), which is a radical polymerization initiator.

PEROYL IB is isobutyryl peroxide (manufactured by NOF CORPORATION).

PERMENTHA H is p-menthane hydroperoxide (manufactured by NOF CORPORATION).

<Covering Step>

An adherend 33 was disposed on a vertical lifting table 36 provided in a vacuum molding apparatus 30 (product name NGF-0510-R Type, Fu-se Vacuum Forming Ltd.) having an upper molding chamber 31 and a lower molding chamber 32. A resin laminate 20 was set on a clamp 35 of the above-mentioned molding apparatus. Then, after the resin laminate 20 was heated to the temperature of 150° C. using a near infrared heater while the pressure was reduced so that each vacuum degree in the upper and lower molding chambers 31, 32 became 1.0 kPa, a molding substrate was elevated to pressure-bond the adherend 33 and the resin laminate 20. Thereafter, compressed air at 150 kPa was introduced only in the upper molding chamber 31, and this was retained for 30 seconds. After the retention, the upper and lower molding chambers 31, 32 were released to atmospheric pressure, and a covered molded article 60 was obtained.

Figure 7:
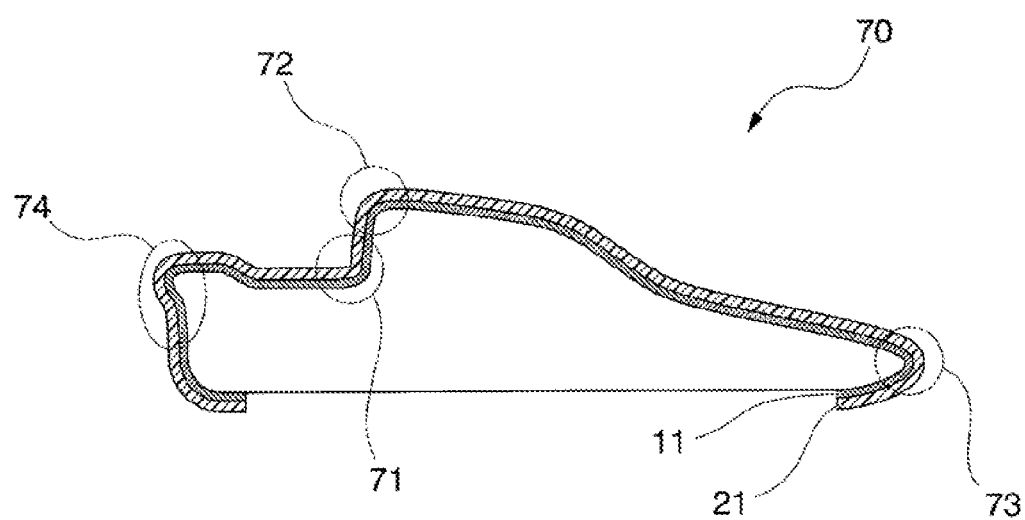
FIG. 7 is a schematic cross-sectional view of one example of an adherend covered with a resin film by the method of producing a molded article of the present embodiment.

The adherend used in the present example was an automobile-shaped model with a length of 15 cm, a width of 10 cm, and a height of 3 cm, the model having a curved surface and a level difference. A schematic cross-sectional view of the automobile model 70 used is shown in FIG. 7. The model 70 has curved surfaces at portions shown by symbols 73, 74, and the like. Furthermore, a portion shown by a symbol 71 has a bending angle of 90° or more.

<Evaluation>

Regarding the resin laminate produced in the above-mentioned resin laminate producing step, an exothermic peak of the adhesive resin layer (adhesive sheet) was measured.

(DSC Measuring Method)

By differential scanning calorimetry (DSC) at a temperature raising rate of 10° C./min, a heat generation starting temperature and peak temperature of the adhesive resin layer (adhesive sheet) were measured. The peak temperature is a measurement value of the temperature of the exothermic peak (peak at which heat generation becomes maximum). The heat generation starting temperature is a measurement value of the temperature at which the peak temperature becomes lowest and the exothermic peak rises up from the baseline. The measurement range was at least 20° C. to 210° C.

Regarding the adherend obtained by the above-mentioned covering step, the adhesiveness of the resin laminate was evaluated according to the following items.

Adhesiveness

The adhesiveness was evaluated according to the following evaluation criteria. "O" or higher grade was determined to be acceptable.

○: There is no floating and no peeling at an adhesion end of the model 70.

Δ: Floating and peeling are partially seen at an adhesion end of the model 70.

×: Floating and peeling are seen overall at an adhesion end of the model 70.

TABLE 2

|  | Exothermic Peak of Adhesive Resin Layer (Adhesive Sheet) (° C.) | Adhesiveness |
|---|---|---|
| Example 1 | 119 | ○ |
| Example 2 | 150 | ○ |
| Example 3 | 117 | ○ |
| Example 4 | 119 | ○ |
| Example 5 | 121 | ○ |
| Comparative Example 1 | 84 | X |
| Comparative Example 2 | 202 | Δ |

As described in the above-mentioned results, in Examples 1 to 5 to which the present invention was applied, the resin film could be uniformly and evenly adhered to the adherend having a curved surface and a level difference without floating even at a portion having a sharp bending angle.

In Comparative Example 1 having a low exothermic peak and Comparative Example 2 having a high exothermic peak, a difference between the peak temperature and the molding temperature was large, so that the deterioration of the adhesiveness and floating at a portion having a sharp angle were seen.

DESCRIPTION OF THE REFERENCE NUMERALS

10: Laminate
11: Adhesive resin layer, adhesive sheet
12, 13: Separator
20: Resin laminate
21: Resin film
30: Vacuum molding apparatus
31: Upper molding chamber
32: Lower molding chamber
33: Adherend
34: Driving device
35: Clamp
36: Table
37: Gas supply chamber
38: Gas suction chamber
60: Adherend covered with resin
70: Model

What is claimed is:
1. A method of producing a molded article, the method comprising the steps of:

producing an adhesive sheet holding body by applying an adhesive raw material composition consisting essentially of an acrylic-based polymer, a thermal polymerization initiator, a curable urethane acrylate, and a crosslinking agent onto a separator to form an adhesive resin layer, and further superposing another separator, peeling one separator of said adhesive sheet holding body and laminating said adhesive resin layer onto a surface of a resin film, followed by peeling the other separator, to produce a resin laminate including said resin film and said adhesive resin layer being laminated; and covering an adherend with said resin film while said resin laminate is pressed against said adherend, and said resin film is stretched following a surface shape of said adherend, wherein a shape when said resin laminate is planarly viewed is larger than a shape when said adherend is planarly viewed, said covering step is a step of heating said resin laminate at a temperature of 100° C. or higher and 180° C. or lower, superposing said resin laminate on said adherend planarly and pressing said resin laminate and said adherend under a reduced pressure environment, and then applying pressure to an environment opposite to said adherend with respect to said resin film, said adhesive resin layer has an exothermic peak in a range of 100° C. or higher and 180° C. or lower in differential scanning calorimetry at a temperature raising rate of 10° C./min, a polymerization initiation temperature of said thermal polymerization initiator is lower than a heating temperature in said covering step by 10° C. or higher and 50° C. or lower, said adhesive resin layer contains said thermal polymerization initiator in an amount of 0.001 to 0.5 parts by weight and said curable urethane acrylate in an amount of 5 to 50 parts by weight, based on 100 parts by weight of said acrylic-based polymer, and contains said crosslinking agent in an amount of 1.5 equivalents or less relative to a functional group of said acrylic-based polymer, and softening of said resin film and curing of said adhesive resin layer progress simultaneously by heating said resin laminate during said covering step.

2. The method of producing a molded article according to claim 1, wherein said adhesive resin layer after heating has an adhesion strength of 30 N/25 mm or more.

3. The method of producing a molded article according to claim 1, comprising, before said step of producing a resin laminate, a step of forming a printing layer or a deposition layer on said resin film.

4. The method of producing a molded article according to claim 1, wherein a forming material of said resin film is at least one selected from the group consisting of an acrylic-based resin, a polyolefin-based resin, a urethane resin, a polyamide resin, a polycarbonate resin, and an ABS resin.

5. The method of producing a molded article according to claim 1, wherein in said adherend, a surface to be covered with said resin film includes a level difference having an angle of 90 degrees or more.

6. The method of producing a molded article according to claim 1, wherein a forming material of said adherend is at least one selected from the group consisting of a carbon fiber-reinforced plastic, a polycarbonate resin, an acrylic-based resin, and an ABS resin.

* * * * *